United States Patent [19]
Massey et al.

[11] Patent Number: 5,692,096
[45] Date of Patent: Nov. 25, 1997

[54] PROTECTION AND CONTROL OF CONTINUOUS BOILING WATER UNITS

[75] Inventors: Raymond Dennis Massey, Port Macquarie; David McLeod Massey, Bangalor; Wieslaw Henryk Sliwa, Macquarie Fields; Philip Ross Pepper, Ashbury, all of Australia

[73] Assignee: Zip Heaters (Australia) Pty Limited, New South Wales, Australia

[21] Appl. No.: 403,336

[22] Filed: Mar. 14, 1995

[30] Foreign Application Priority Data

Mar. 15, 1994 [AU] Australia .................. PM4483

[51] Int. Cl.$^6$ .................. H05B 1/02; F24H 9/20
[52] U.S. Cl. .................. 392/464; 392/454; 392/451; 392/498
[58] Field of Search .................. 392/456, 479, 392/464, 458, 459, 454, 463, 451, 498; 219/492

[56] References Cited

U.S. PATENT DOCUMENTS

| | | | |
|---|---|---|---|
| 3,793,934 | 2/1974 | Martin . | |
| 4,354,094 | 10/1982 | Massey et al. | 392/451 |
| 4,455,477 | 6/1984 | Massey et al. | 392/451 |
| 4,520,259 | 5/1985 | Schoenberger | 392/463 |
| 4,602,145 | 7/1986 | Roberts | 392/498 |
| 5,001,969 | 3/1991 | Moore et al. | 219/492 |
| 5,038,752 | 8/1991 | Anson . | |
| 5,263,116 | 11/1993 | Hammond | 392/451 |

FOREIGN PATENT DOCUMENTS

| | | |
|---|---|---|
| B-412689 | 11/1967 | Australia . |
| B-531 449 | 8/1983 | Australia . |
| A-2653532 | 4/1991 | France . |
| 1250939 | 9/1967 | Germany . |
| 3733917 | 4/1989 | Germany . |
| 2 185 161 | 7/1987 | United Kingdom . |

OTHER PUBLICATIONS

Patent Abstracts of Japan, vol. 18, No. 101 (C-1168) Feb. 18, 1994 and JP-A-5300831 (Toshiba Heating Appliances Co.) Nov. 16, 1993.

*Primary Examiner*—Tu B. Hoang
*Attorney, Agent, or Firm*—Curtis Morris & Safford, P.C.

[57] ABSTRACT

A continuous boiling water unit is disclosed and comprises a water heating tank (1) containing an electric heating element (2) near the bottom of the tank (1) and a level control tank (3) mounted alongside the heating tank (1). An interconnecting steam communication port (21) is located between the level control tank (3) and the heating tank (1), together with a draw-off connection (23) and a flow connection (10). There further comprises an electronic temperature sensor in the form of a thermister (50) operable to sense the temperature of water in the heating tank (1), and upon sensing boiling of the water in the heating tank (1), operable to cause cut-off of the supply to the heating element (2).

7 Claims, 6 Drawing Sheets

PROTECTION AND CONTROL OF CONTINUOUS BOILING WATER UNITS

FIELD OF THE INVENTION

This invention relates to methods and apparatus for the protection and control of continuous boiling water units.

BACKGROUND OF THE INVENTION

The invention relates to boiling water units of the type described in commonly-owned Australian Patent No. 531449, the contents of which are incorporated herein by cross-reference.

It is the purpose of such boiling water units to maintain a continuous supply of water at a temperature typically to within a few degrees of boiling.

SUMMARY OF THE INVENTION

It is a preferred object of the present invention to offer improvements in the operation or protection and/or control of such boiling water units.

The invention discloses a continuous boiling water unit comprising a water heating tank containing an electric heating element near the bottom of the tank, a level control tank mounted alongside the heating tank, an interconnecting steam communication port between the level control tank and the heating tank, a draw-off connection from the heating tank, a flow connection between the level control tank and the water heating tank, and an electronic temperature sensing device operable to sense the temperature of water in the heating tank, and upon sensing of the water in the heating tank to be at a boiling temperature, operable to cause the cut-off of electricity to the heating element.

In an embodiment the electronic temperature sensing device is located within the level control tank and senses the boiling temperature of the water in the heating tank by virtue of steam flowing from the heating tank through the communication port to the level control tank.

Alternatively, the electronic temperature sensing device is located on an external surface of either the water heating tank or the level control tank, and the boiling temperature of the water in the water heating tank is determined by a knowledge of heat loss properties from within either the water heating tank or the level control tank to the respective outer surface.

The boiling water unit can further comprise electronic control means that has input an electrical signal of the electronic temperature sensing device representative of the sensed temperature, and whereby the control means compares the input signal with an adjustable level corresponding to the boiling temperature of the water in the heating tank, and provides an output signal to control the cut-off of electricity to the heating element if the sensed temperature is greater than or equal to said boiling temperature otherwise to cause the supply of electricity to the heating element.

The electronic control means can further include a timer that counts elapsed time from the last cut-off of electricity to the heating element, and whereby, at the end of a predetermined period of elapsed time, the control means causes the supply of electricity to the heating element. Additionally, the timer further is operable to remove supply of electricity to the heating element during a time of day that boiling water is not required.

In one preferred form the electronic temperature sensing device is a thermister.

The level control tank of the boiling water unit can include a float-actuable valve connected to a supply of water, and arranged to maintain water in the level control tank within predetermined limits, and whereby the electronic temperature sensing device is located in a position such that on activation of the valve, inflowing water is caused to impinge upon the electronic temperature sensing device, thus causing sensing of a temperature below boiling and causing supply of electricity to the heating element.

The continuous boiling water unit can further comprise a back-up electronic temperature sensing means that is in communication with electronic control means to cause the cut-off of electricity to the heating element upon sensing the water in the heating tank to be at the boiling temperature.

The invention further discloses a method for controlling operation of a boiling water unit, said boiling water unit having a water heating tank containing an electric heating element near the bottom of the tank, a level control tank mounted alongside the heating tank, an interconnecting steam communication port between the level control tank and the heating tank, a draw-off connection from the heating tank and a flow connection between the level control tank and the water heating tank, the method comprising the steps of: sensing, by an electronic temperature sensing device, the temperature of water in the heating tank; and upon the sensed temperature corresponding to a boiling temperature, causing the cut-off of electricity to the heating element.

In an embodiment, the method further comprises the steps of controlling, by electronic control means, the cut-off of electricity to said heating element in accordance with the sensed temperature of said temperature sensing device being greater than or equal to an adjustable temperature level corresponding to the boiling temperature of the water in said water heating tank input to said electronic control means, otherwise causing the supply of electricity to the heating element.

Preferably, the method further comprises the steps of counting, by said control means, elapsed time from the last occurrence of the cut-off of electricity to the heating element, and at the end of a predetermined period of elapsed time causing the supply of electricity to the heating element.

The method can further include the further steps of removing, by said control means, the supply of electricity to the heating element in response to the timer determining it to be a time of day that boiling water is not required.

DESCRIPTION OF THE DRAWINGS

Embodiments of the invention will be described with reference to the accompanying drawings, in which.

DESCRIPTION OF PREFERRED EMBODIMENTS

Figure 1:
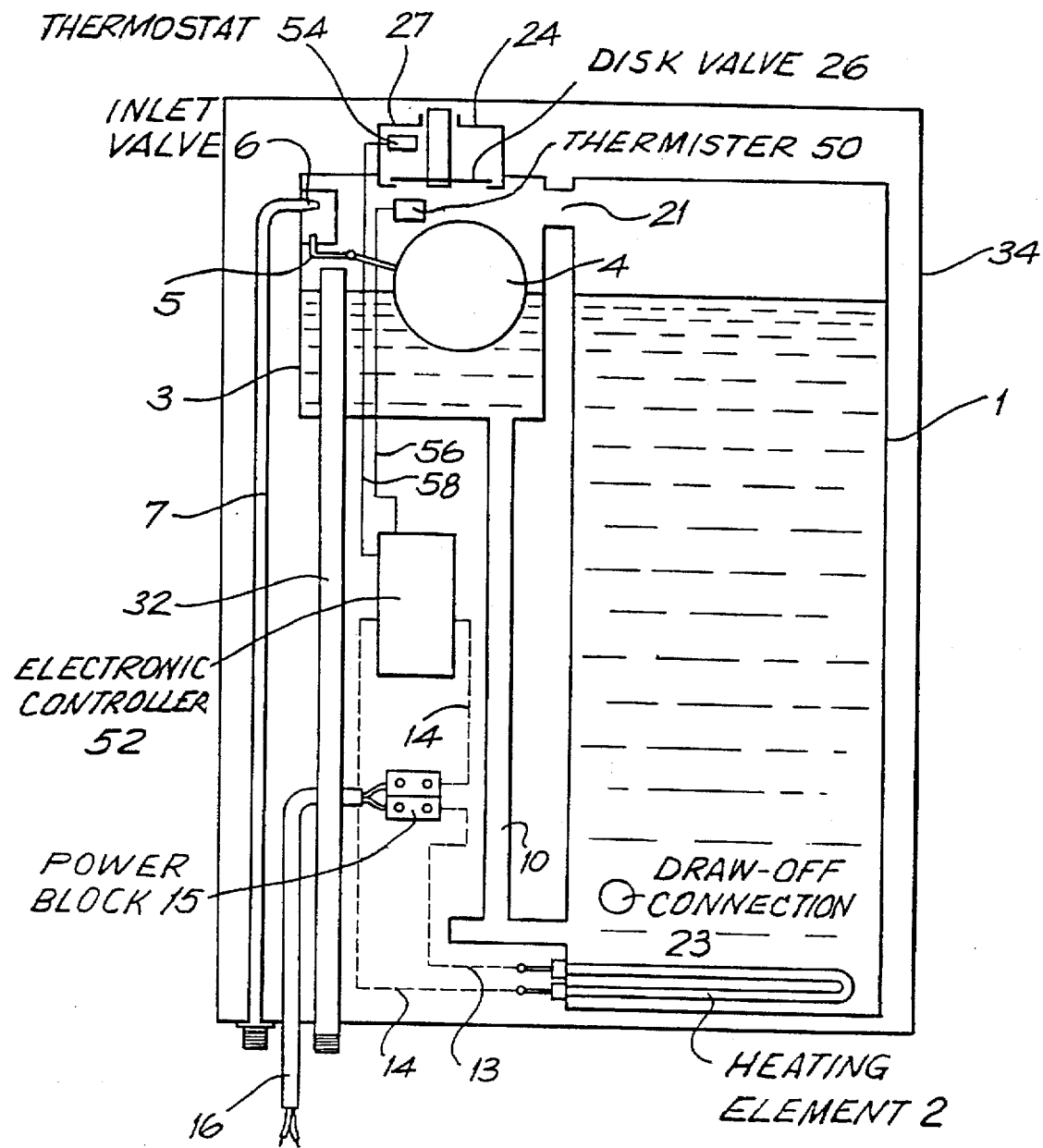
FIG. 1 is a cross-sectional view of a continuous boiling water unit.

Reference numerals common with those used in the description and drawings of Australian Patent No. 531449 again have been used, and the function of those components is as described in the noted patent.

The boiling water unit shown in FIG. 1 has an electronic temperature sensing device in the form of a thermister 50 located within the level control tank 3 at a position remote from the interconnecting conduit 21. The thermister 50 is sensitive to detect temperature and is connected with an electronic controller 52 by an interconnecting wire 56.

The thermister 50 detects that the water in the heating tank 1 is boiling by sensing the temperature of the surrounding air. The air temperature is elevated due to the presence of steam coming-off the water and passing through the conduit 21 into the space above the water level in the level control tank 3. By way of example, when the water in the heating tank 1 reaches 100° C. and boils (i.e. at an atmospheric pressure corresponding to sea level), some of the steam given off travels into the level control tank 3 and raises the ambient air temperature to about 85° C.

A thermister 54, forming a part of the over-pressure safety device situated atop the level control tank 3, replaces the capillary 29 shown in Patent No. 531449.

Operation of the boiling water unit will be described with reference to FIGS. 2 to 6. The boiling water unit has four main 'routines' controlling its operation. FIG. 3 shows a flow diagram of the primary routine (or main loop). Within this main loop a subordinate temperature control routine, shown in FIG. 4, takes place, as does an After Hours operation routine, shown in FIG. 6. The overload protection routine, shown in FIG. 5, functions independently of the main loop.

Implementation of these routines is achieved by means of software executed by the microprocessor 66 of the electronic controller 52. The relevant routines are stored in the memory 70 associated with the processor 66. It would be a matter of routine for a computer programmer to write the necessary software to implement the routines as presently will be described.

The controller 52 receives the active power wire 14, passing through two inline relay controlled contacts 60,82. The output signal of the thermister 50, passed along wire 56, is supplied to an input buffer device 64. Similarly, the output signal from the thermister 54, passed by the wire 58, is supplied to the input buffer device 64. These two signals are converted into an appropriate data format suitable to be read by the processor 66. That data is passed from the input buffer device 64 to the processor 66 via a data bus 68.

The processor 66 outputs signals to control each of the relay control devices 76,80. The relay control device 76 receives its controlling signal on output line 74, whilst the relay control device 80 receives its controlling signal by output line 78. Each relay control device 76,80 cause opening and closing of a respective contact 60,82. The contacts 60,82 control the supply or the cut-off of electricity to the heating element 2.

Figure 2:
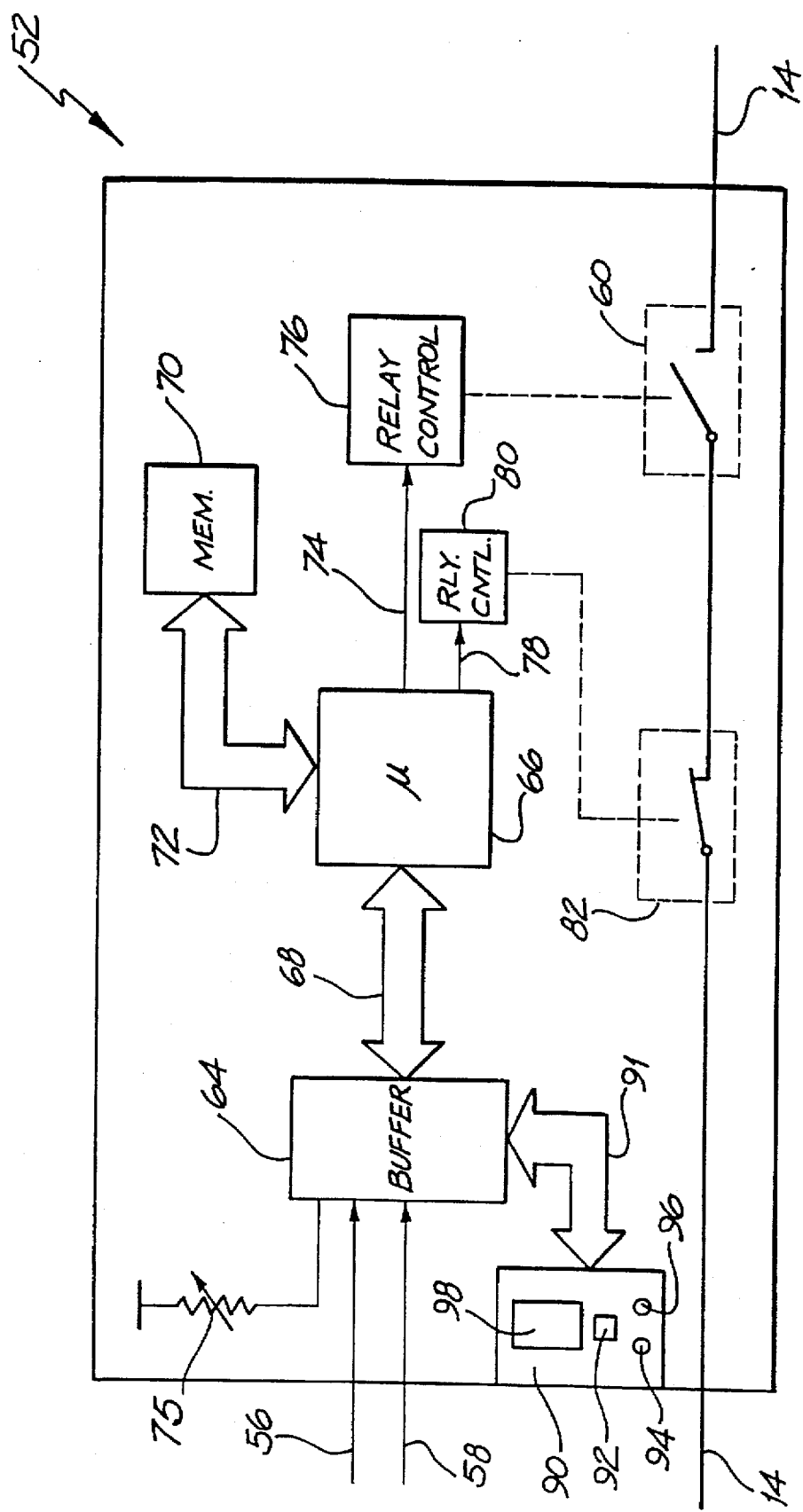
FIG. 2 is a schematic diagram for the electronic controller shown in FIG. 1.
Figure 3:
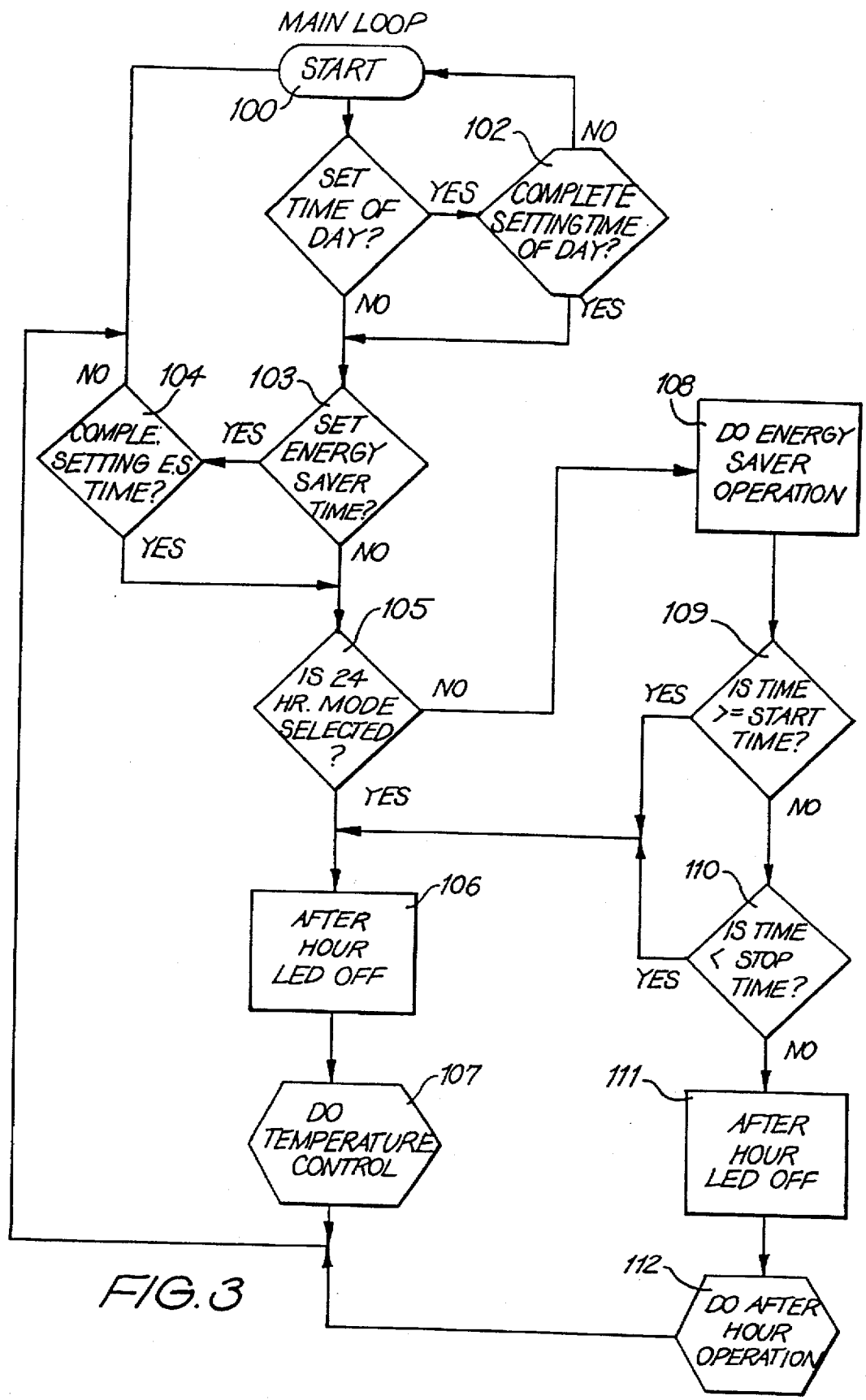
FIG. 3 is a flow diagram relating to operation of the boiling water unit.

FIG. 2 also shows a user control panel 90, for convenience indicated as a part of the electronic controller 52. It is equally possible that the user controls 90 are remote from the control 52, but connected thereto by an extended form of the bus arrangement 91. The user controls include a time of day clock that is user adjustable with respect to the time of day, and also with respect to the hours between which the After Hours operation is to take place.

A pushbutton 92 is provided that allows selection of either continuous operation or After Hours operation. A ready LED 94 is provided as is an After Hours LED 96.

As shown in FIG. 3, the main loop commences at step 100, and firstly requires setting of a time-of-day clock (steps 101 and 102). This is followed by setting of the time-of-day pertaining to the energy saving function (steps 103 and 104), by which a time is set, typically outside of normal business hours, in which the boiling water unit is not required to continuously maintain boiling water for use. The energy saving mode therefore allocated a time of day where the boiling water unit automatically switches off, thus providing a significant energy saving.

Step 105 determines whether a 24 hour mode is selected. This is a determination of whether continuous boiling water is required for 24 hours of the day. If so, then the routine continues to step 106, but if not, the energy saver operation is commenced (steps 108–112). The After Hours (energy saving) operation (step 112) is shown in more detail in FIG. 6.

Figure 4:
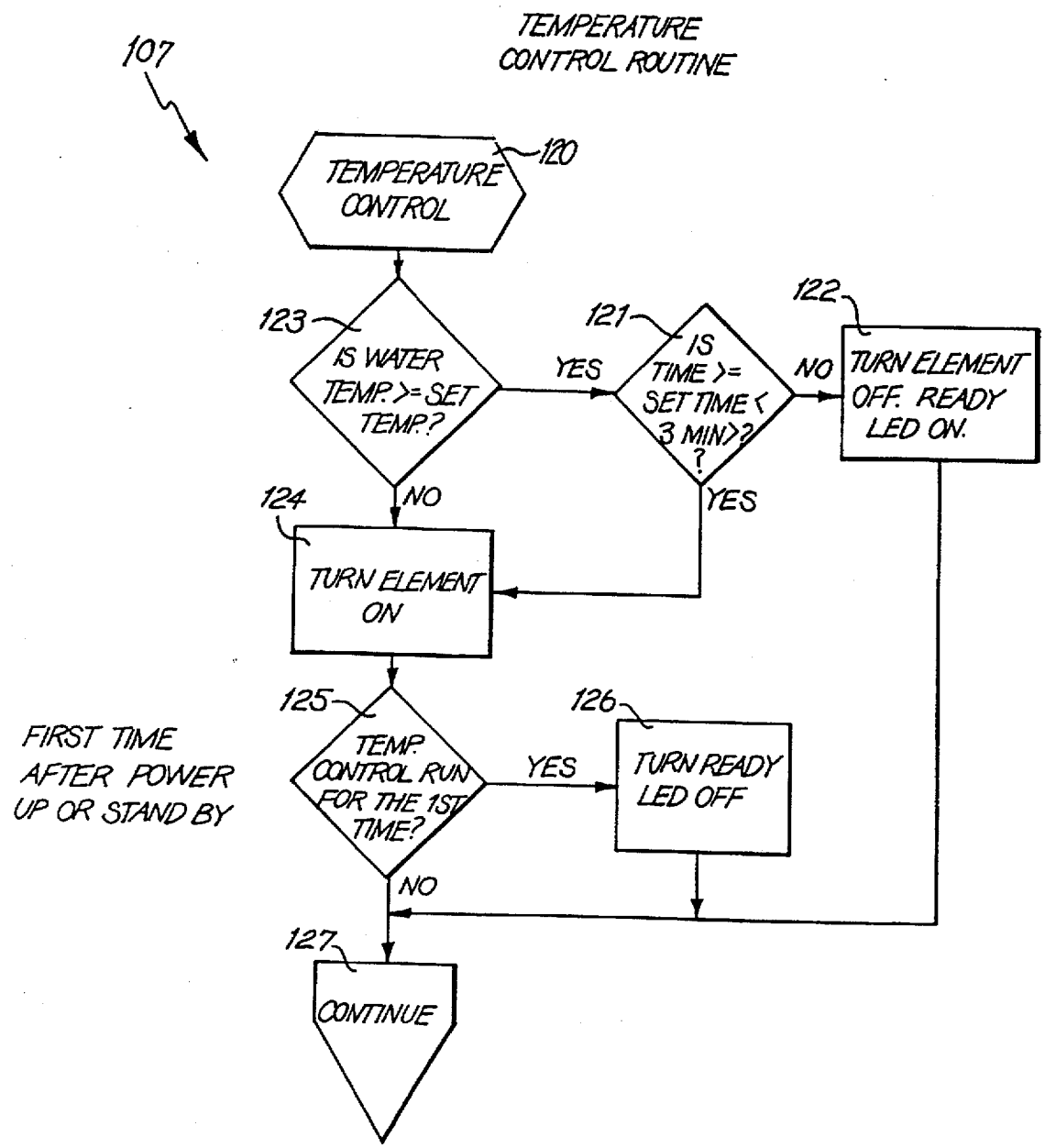
FIG. 4 is a flow diagram of the temperature control operation.

In the case of 24 hour operation, the temperature control routine (step 107) is continuously performed. Referring to FIG. 4, it can be seen that the temperature control firstly determines whether the water temperature sensed by the thermister 50 is greater than an adjustable "set temperature", corresponding to boiling of the water in the water heating tank 1. The "set temperature" value is variable, since the temperature of boiling will reduce with increasing altitude. The set level is adjusted by the supplier before delivery by means of the potentiometer 75 shown in FIG. 2.

If the water temperature is below the "set temperature", then the element 2 is caused to turn ON (step 124). If the water temperature is greater than or equal to the "set temperature", it is not necessary to heat the water, but at the same time a three minute timer commences (step 121). If that time period has not elapsed, then the heating element 2 remains turned OFF (step 122). Therefore, in this embodiment, the thermister 50 is used only to determine when the temperature of water in the heating tank 1 is boiling. The determination of whether the water temperature has decreased to a point where it requires to be reheated is governed entirely by the timer. When the three minute interval times out the heating element 2 is caused to turn ON. It is possible, in other embodiments, to utilise the output signal of the thermister 50 in determining when the element is to be turned on. The time period of three minutes is variable, and dependents upon the normal convective heat losses from the boiling water unit. Therefore, the "set time" interval also is factory adjustable.

The steps 124,122 that turn the heating element 2 ON and OFF therefore cause an output to be placed on the line 74, respectively to cause the relay control device 76 to close or open the contact 60, thereby either supplying or cutting-off electricity to the heating element 2.

Figure 6:
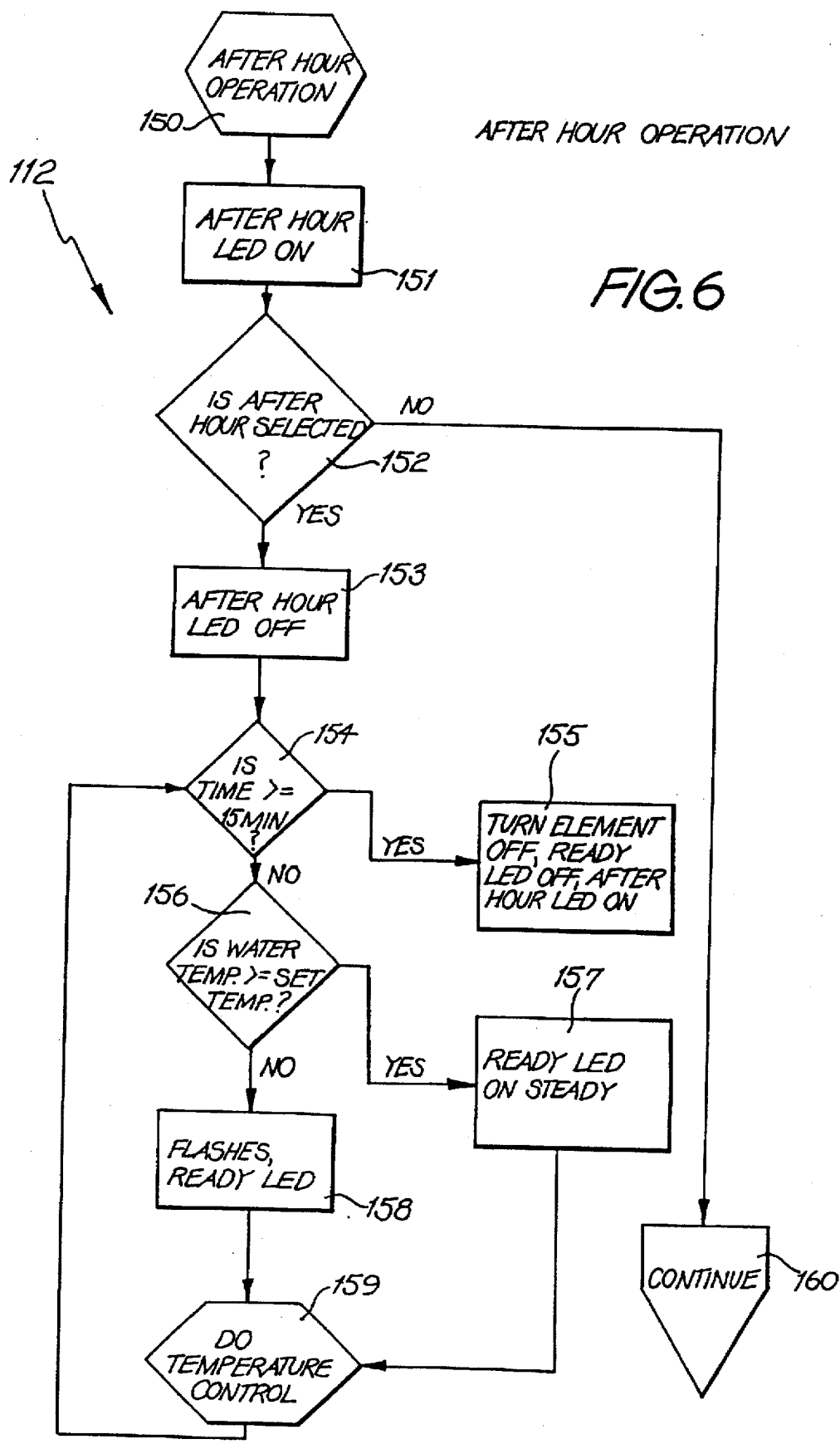
FIG. 6 is a flow diagram of the 'After Hours' operation.

The After Hours operation, as shown in FIG. 6, operates such that the boiling water unit is turned OFF unless required for use. Upon selection of After Hours service (step 152), by virtue of the After Hours pushbutton 92, the water is heated to boiling and maintained in this condition by temperature control routine (step 159 and FIG. 3) for a period of fifteen minutes, after which time the boiling water unit is switched OFF. During heating, the Ready LED 94 flashes, and when the water is boiling, the LED is maintained as a steady light (steps 158,157). Steps 151,153 and 155 also control operation of the ready LED 94 and the After Hours LED 96.

Figure 5:
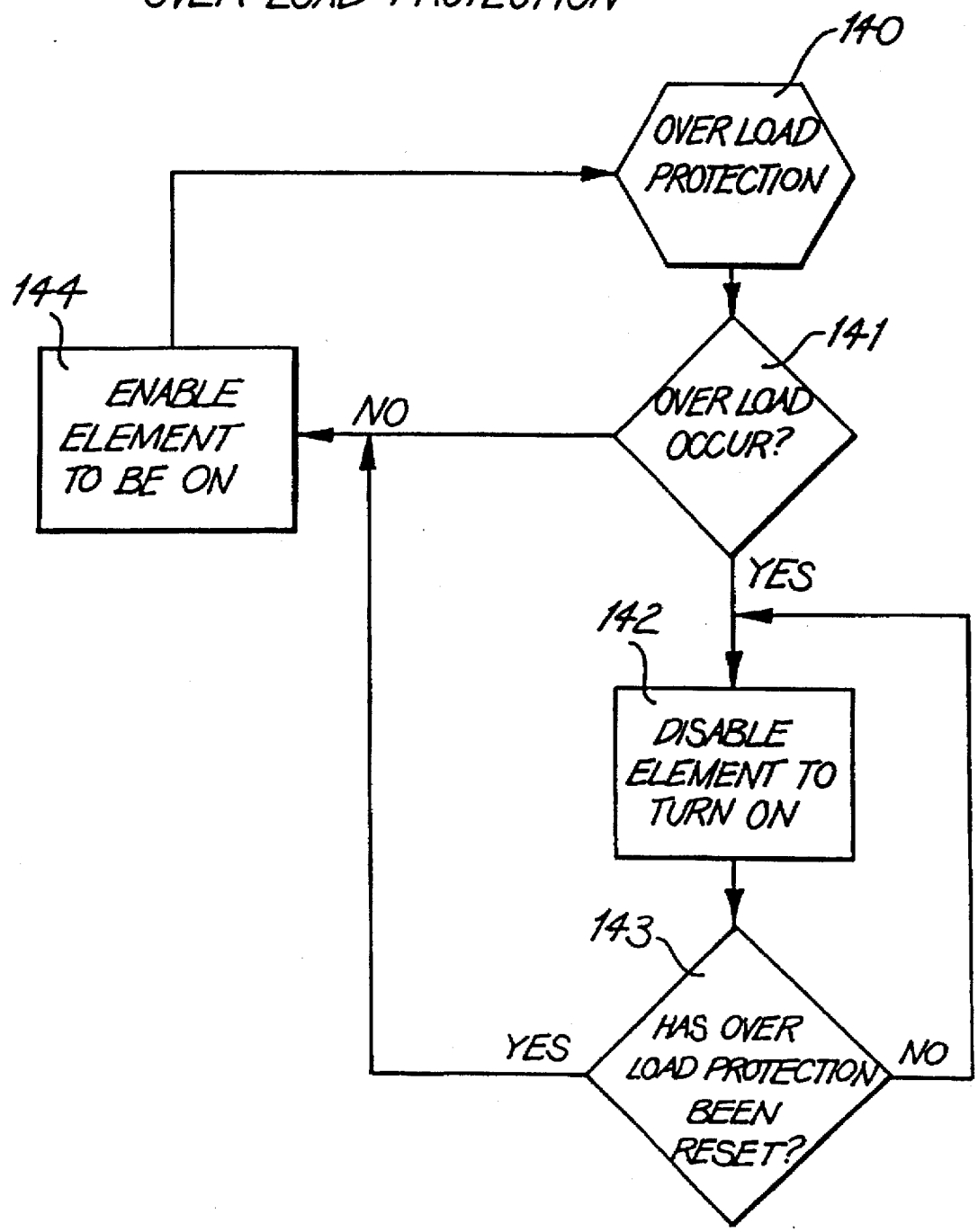
FIG. 5 is a flow diagram of the overload protection operation.

FIG. 5 shows the overload protection routine. This routine operates independently of the main loop shown in FIG. 3. An electrical input signal from the safety or overload thermister 54 is separately processed by the processor 66 to gain an indication of temperature, and thereby obtain a back-up system should the primary temperature sensing thermister 50 fail.

Another failure mode will occur if the contact 60 welds in the closed position. Even if the relay control device 76 is attempting to open the contact 60 to cut-off the supply of electricity, such will not occur.

By virtue of the contact 82 being in series with the contact 60, opening of that normally-closed contact will remove the supply of electricity to the heating element 2. Therefore, the step 141 represents a determination of the sensing of excess temperature. If this is not the case, then step 144 enables the heating element to be ON being effected by maintaining the contact 82 as closed. On the other hand, if there is an overload condition, then step 142 disables the supply of electricity to the element by opening the contact 82. The step 143 contemplates the situation where the overload sensing device is resettable.

The thermister 54 can be mounted at any convenient location on the boiling water unit. One embodiment has the thermister 54 as a part of the over-pressure safety device 24.

The boiling water unit is the subject of convective heat loss, in which case regular reheating of the water to boiling is required, and takes place in accordance with the methodology discussed above. The methodology equally applies to the instance where water is drawn-off from the outlet connection 23. Replenishing water is supplied to the level control tank through activation of the inlet valve 6, allowing water to discharge from the inlet pipe 7. The replenishing water is directed towards, and washes over, the thermister 50. The temperature detected by the thermister 50 then correctly determines that the water within the heating tank 1 is no longer boiling. This arrangement also is disclosed in commonly owned Australian Patent No. 637412.

It is preferred, but not essential, that the thermister 50 is located in the position shown to come under the influence of the replenishing inlet water, since the ambient temperature in the level control tank 3 will, in any event, reduce.

A number of advantages occur by virtue of the embodiment described, in that the replacement of the control and protection devices described in Australian Patent No. 531449 with electronic devices and controls results in greater linearity, accuracy and reliability. Furthermore, the cost of these components is significantly less than the previously used componentry, thus reducing the overall cost of the water heating unit. Assembly too is simplified, which further leads to a reduction in unit cost.

The After Hours function has the great benefit of saving on electrical consumption, and hence costs by, for example, shutting off the boiling water unit out of normal business hours.

In another embodiment, the thermister 50 can be located on the external wall surface of the level control tank 3, and the methodology for protection and control still is achievable by obtaining a knowledge of the heat loss (thermodynamic) relationship between the presence of steam within the level control tank and the surface temperature of the level control tank 3. An advantage in locating the thermister 50 at the external surface is that construction of the water heating unit becomes even simpler, and therefore less costly.

Numerous alterations and modifications, as would be apparent to one skilled in the art, can be made without departing from the broad inventive scope of the present invention.

What we claim is:

1. A continuous boiling water unit comprising a water heating tank containing an electric heating element near the bottom of the tank, a level control tank mounted alongside the heating tank, an interconnecting steam communication port between the level control tank and the heating tank, a draw-off connection from the heating tank, a flow connection between the level control tank and the water heating tank, a temperature sensing device operable to remotely sense the temperature of water in the heating tank, and control means, coupled to said temperature sensing device and said heating element, and operable to cause the cut-off of electricity from said heating element when said temperature sensing device senses water in said heating tank to be boiling, and wherein the control means includes an adjustable timer operable to determine elapsed time from the last occurrence of cut-off electricity, and when said elapsed time equals or exceeds a predetermined time interval, causing said control means to supply electricity to said heating element to heat said water.

2. A boiling water unit as claimed in claim 1, wherein the timer further is operable to remove the supply of electricity to the heating element during a time of day that boiling water is not required.

3. A boiling water unit as claimed in claim 1, further comprises a backup electronic temperature sensing means in communication with electronic control means to cause the cut-off of electricity to the heating element upon sensing the water in the heating tank to be at the boiling temperature.

4. A boiling water unit as claimed in claim 1, wherein the temperature sensing device is a thermistor.

5. A method for controlling operation of a boiling water unit, said unit having a water heating tank containing an electric heating element near the bottom of the tank, said method comprising the steps of:

sensing the temperature of water in said heating tank, and if said temperature indicates the water to be boiling, causing said electricity to said electric heating element to be cut-off, and determining elapsed time from the last occurrence of cut-off of electricity, and if said elapsed time equals or exceeds a predetermined time interval, causing the supply of electricity to said heating element to heat said water.

6. A method as claimed in claim 5, comprising the further steps of cutting-off electricity to the heating element during a time of day that boiling water is not required.

7. A method as claimed in claim 6, comprising the further step of adjusting said predetermined time in accordance with the convective heat losses from the water in the heating tank.

* * * * *